United States Patent
Nieländer

[15] 3,695,585
[45] Oct. 3, 1972

[54] MIXING AND PLASTICIZING MACHINE AND PROCESS FOR OPERATING SAID MACHINE

[72] Inventor: Henrik Nieländer, Bahnhofstrasse 94, CH-8001 Zurich, Switzerland

[22] Filed: May 19, 1970

[21] Appl. No.: 38,678

[30] Foreign Application Priority Data

May 23, 1969 Switzerland ............... 7776/69

[52] U.S. Cl. .................................... 259/5, 259/64
[51] Int. Cl. ............................................ B01f 5/06
[58] Field of Search .......... 18/30; 259/52, 21, 27, 40, 259/47, 70, 71, 112, 113, 9, 10, 64

[56] References Cited

UNITED STATES PATENTS

| | | | |
|---|---|---|---|
| 3,023,455 | 3/1962 | Geier | 259/2 |
| 3,347,528 | 10/1967 | List | 259/2 |
| 3,183,553 | 5/1965 | Slater | 259/9 |
| 2,859,017 | 11/1958 | Trumbull | 259/2 |
| 2,948,920 | 8/1960 | Hausman | 259/2 |

*Primary Examiner*—Robert W. Jenkins
*Attorney*—Littlepage, Quaintance, Wray & Aisenberg

[57] ABSTRACT

A mixing and plasticizing machine which comprises at least one mixing and plasticizing cylinder together with at least one screw cylinder and at least one axially movable mixing and plasticizing rotor with passages. The shaft of said mixing and plasticizing rotor is connected to a rotary drive outside the mixing and plasticizing cylinder. At least one axially movable, rotary screw is coaxially connected to said mixing and plasticizing rotor.

17 Claims, 8 Drawing Figures

MIXING AND PLASTICIZING MACHINE AND PROCESS FOR OPERATING SAID MACHINE

This invention relates to a mixing and plasticizing machine. Particularly, the machine according to the present invention may be used for batch mixing or continuous mixing of plastics and rubber as well as other highly viscous materials. The machine according to the present invention may also be used as a batch mixer or as a continuous mixing machine for materials in paste form, powder form and liquid form.

In patent specification No. 882,613, filed Dec. 5, 1969 (patent application Ser. No. 882,613, filed Dec. 5, 1969) a machine for mixing and plasticizing of plastics, rubber and other highly viscous materials at controlled pressure, friction and shear forces of any desired value is described. Said machine is i.a. characterized by the fact that an axially movable mixing and plasticizing rotor with passages of any desired cross-sectional configuration is pressed through the mixing and plasticizing material, the mixing and plasticizing material being pressed through the passages of said mixing and plasticizing rotor in in a manner similar to maccaroni, i.e. in the form of strings or ribbons. During the simultaneous rotation and axial motion of the mixing and plasticizing rotor these material parts, similar to strings, are sheared off continuously and forced together in radial direction as well as in axial direction, so that controlled shear forces or shear gradients of any desired value may be attained. Moreover, as the mixing and plasticizing material is pressed against the rotor area between the passages of the mixing and plasticizing rotor, controlled frictional forces of any desired value may be attained, these frictional forces, as known, being very important to the mixing and plasticizing process, even in the molecular area.

The mixing and plasticizing machine according to the present invention is plasticizing by at least one mixing and plasticizing cylinder with at least one screw cylinder, at least one axially movable mixing and plasticizing rotor with aperture passages of any desired cross-sectional configuration, the shaft of said mixing and plasticizing rotor being connected to a rotary drive outside said mixing and plasticizing cylinder, the internal wall area of said mixing and plasticating cylinder being scraped off by said mixing and plasticizing rotor and at least one axially movable rotary screw, which is coaxially connected to said mixing and plasticizing rotor.

The mixing and plasticizing process performed by the machine according to the present invention is extremely intensive and the machine is not only useful for mixing and plasticizing of highly viscous elastomers but also for mixing and plasticizing of plastics in powder form, granular form, piece form and in the form of film linters, film rolls and other plastic scrap. In this case the plastic material totally or partly may be plasticizing by the frictional heat generated by the friction between the mixing and plasticizing rotor and the plastic material. The machine according to the present invention is i.a. also particularly useful for plasticizing, melting and mixing of high molecular plastics in powder form, these plastics often having a very low coefficient of friction. In mixing and plasticizing devices of prior art these plastics either cannot be processed at all or only with great difficulty. In the machine according to the present invention the plastic and rubber materials may be mixed with any desired filling agents, colorants and reinforcing agents, such as glass fibers, asbestos, etc., continuously or batch-wise. The machine according to the present invention is also useful for the mixing of liquid plastics with colorants, fillers, etc., and also for continuous or batch-wise mixing of plastics in powder form with colorants, fillers, stabilizating agents, slip agents, etc. Moreover, pasty or liquid dispersions of plastics, fillers and colorants, etc., with liquid plasticizers, solvents, etc., may be prepared with the machine according to the present invention.

The machine according to the present invention is also particularly useful as a plasticizing machine for injection molding machines, blow molding machines, presses, extruders, etc.

In order that the invention may be more clearly understood, some embodiments thereof will now be described, by way of example, with reference to the accompanying drawings, in which.

Figure 2:
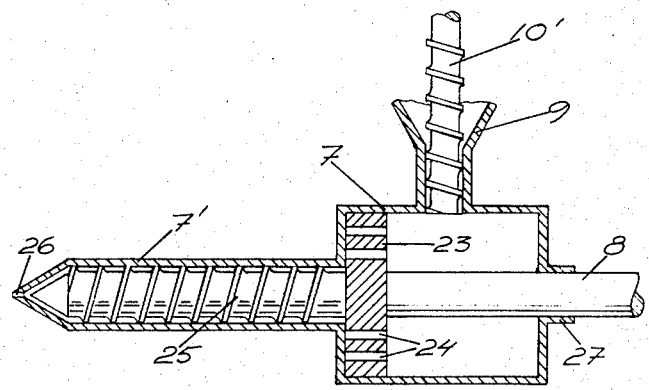
FIG. 2 is a vertical longitudinal sectional view of the mixing and plasticizing cylinder with the screw cylinder, and the mixing and plasticizing rotor with the screw, a feeding screw being provided.
Figure 3:
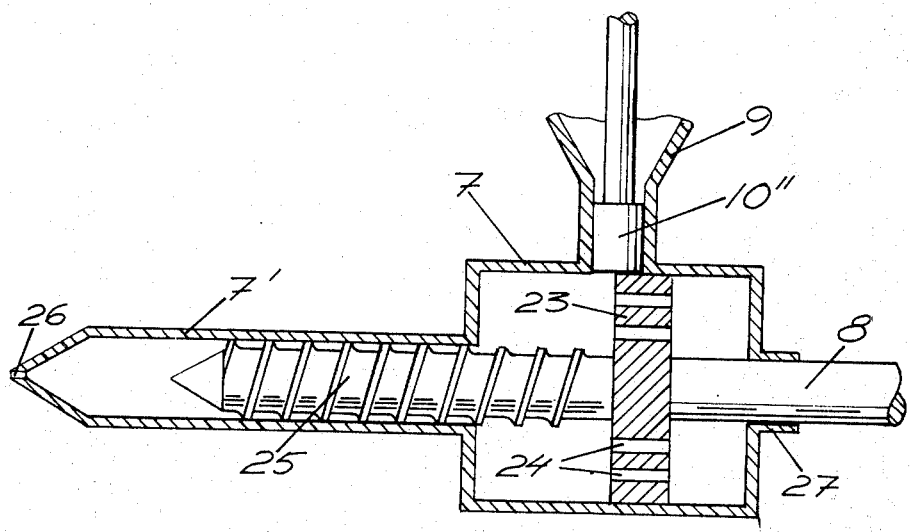
Figure 4:
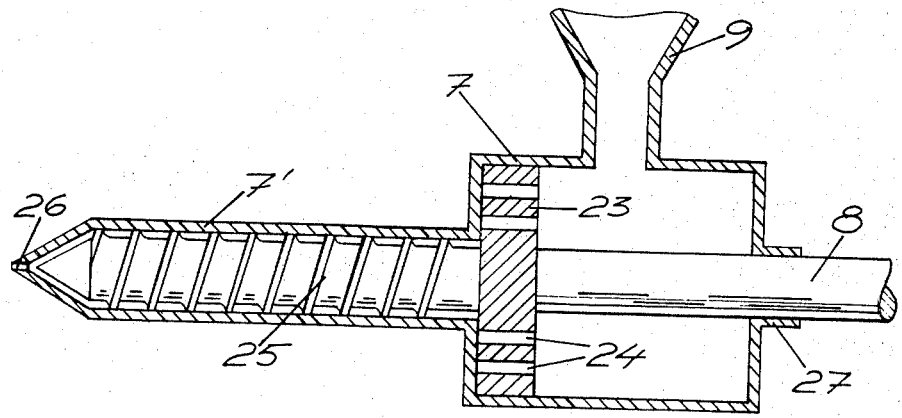
Figure 5:
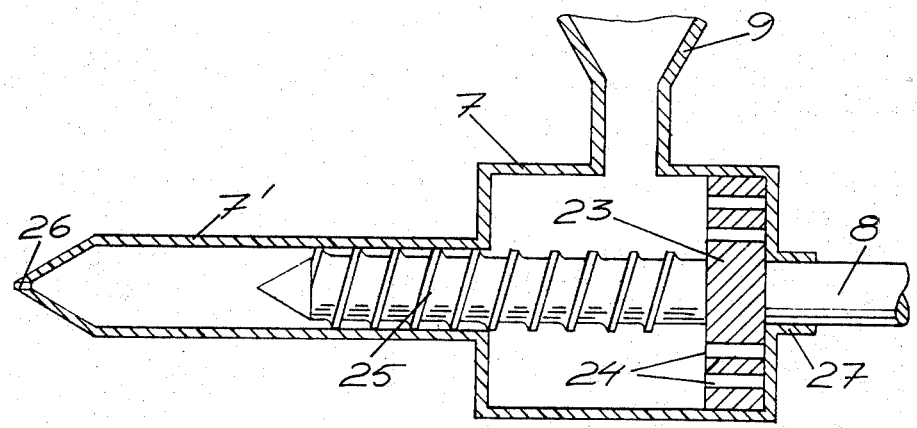
Figure 6:
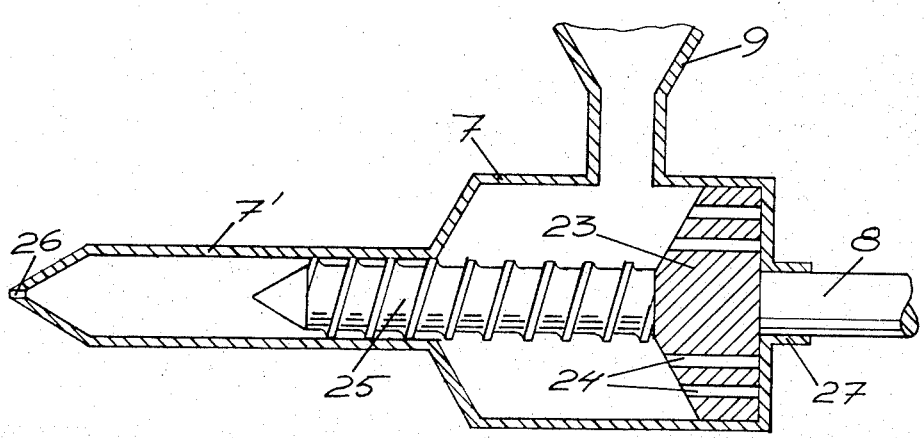
Figure 7:
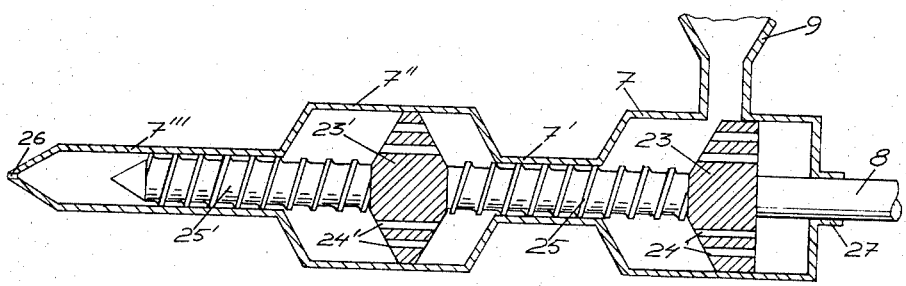
Figure 8:
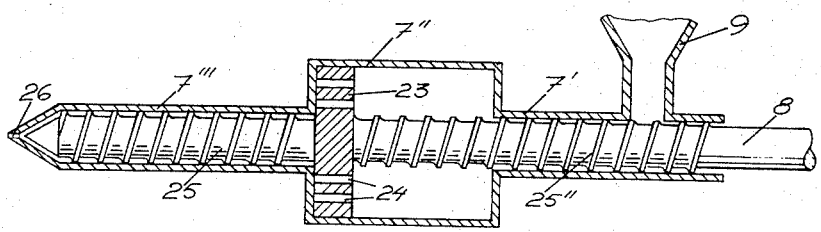

FIG. 3 a vertical longitudinal sectional view of the mixing and plasticizing cylinder with the screw cylinder, the mixing and plasticizing rotor with the screw having been axially moved. Instead of the feeding screw according to FIG. 2 a feeding ram has been provided;

FIGS. 4 and 5 also represent a vertical longitudinal sectional view of the mixing and plasticizing cylinder with the screw cylinder, the mixing and plasticizing rotor with the stroke 5 having been axially moved one full stroke compared to the position according to FIG. 4;

FIG. 6 represents a vertical longitudinal sectional view of a mixing and plasticizing cylinder with partially conical design of the mixing and plasticizing cylinder and the mixing and plasticizing rotor;

FIG. 7 represents a vertical longitudinal sectional view of a machine for continuous operation with two consecutive axially movable mixing and plasticizing rotors with corresponding screw elements;

FIG. 8 represents a vertical longitudinal sectional view of a machine for continuous operation with another placement of the feeding hopper.

Figure 1:
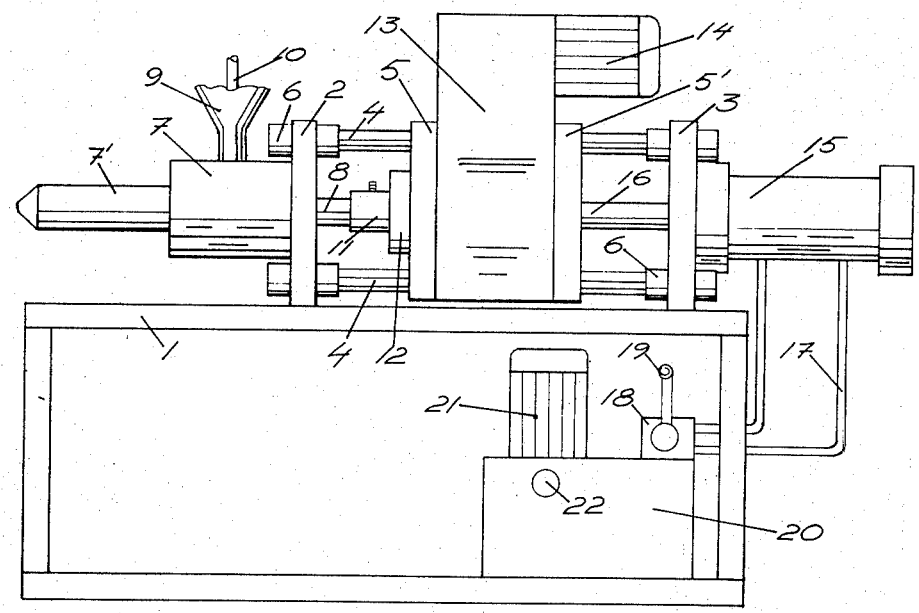
FIG. 1 is a side elevational view of the machine according to the present invention.

The drawings are hereinafter explained in detail:

Referring to FIG. 1, the machine illustrated comprises a machine base 1, on which the two fixed platens 2 and 3 are mounted. These two platens are firmly mounted on 1. The platens 2 and 3 are firmly connected to each other by four tie-rods 4 as well as the tie-rod nuts 6, so that the press structure of a horizontal four-column press is formed. Between the platens 2 and 3 and on the tie-rods 4 two axially movable platens 5 and 5' are provided. The mixing and plasticizing cylinder 7 with the screw cylinder 7' is mounted at the fixed platen 2. The shaft 8 of the mixing and plasticizing rotor is guided through a bore of the fixed platen 2 and is mounted in a seal bushing of the mixing and plasticizing cylinder in such a way that it can be rotated and axially moved. 9 is a feeding hopper and 10 is a feeding ram or a rotary feeding screw. The shaft 8 is via a coupling 11 connected to the drive shaft of the rotary drive 13,14; and 12 being the bearing housing. The rotary drive 13,14 is mounted between the two axially movable platens 5 and 5', 13 being the gear drive and 14 the motor. At the fixed platen 3 a double-action working cylinder, in this case a hydraulic cylinder, is mounted. The piston rod 16 of the hydraulic cylinder 15 is firmly connected to platen 5'. By interaction of the piston rod 16 of the hydraulic cylinder 15, the rotary drive 13,14 may be axially moved on the tie-rods and thus the shaft 8 with the mixing and plasticizer rotor may be axially moved in the mixing and plasticizer cylinder 7 at a pressure force of any desired value and at a torque of any desired value, the screw simultaneously being axially moved in the screw cylinder 7'. 17 represents the oil lines of the hydraulic cylinder 15 and 18 represents a hydraulic valve with pressure control valve. 19 is the switch lever for the actuation of said hydraulic valve and 20 is the hydraulic pump group with oil container. 21 is the motor of the hydraulic pump group and 22 is a manometer.

FIG. 2 represents a vertical longitudinal sectional view of the mixing and plasticizing cylinder 7 with the screw cylinder 7', in this case a feeding screw 10' being provided. 23 represents the mixing and plasticizing rotor with passages of any desired cross-sectional configuration 24. The passages may for example be holes, slots or polygonal passages. 25 represents the screw, which is coaxially firmly connected to the mixing and plasticizing rotor and which is rotary and axially movable together with the mixing and plasticizing rotor. 26 represents the orifice or discharge opening of the screw cylinder 7'. 27 represents the seal bushing for the shaft 8 in the mixing and plasticizing cylinder 7.

In FIG. 3, instead of the feeding screw 10', a feeding ram 10'' has been provided, the latter being useful for feeding highly viscous, sticky or non-free-flowing materials into the mixing and plasticizing cylinder.

The function of the machine described is explained with respect to FIGS. 2 to 5. FIGS. 4 and 5 represent the two end positions of the mixing and plasticizing rotor 23 with the screw 25.

If the machine is to work batch-wise, the material to be mixed or plasticized is fed via the feeding screw 10' or via the feeding ram 10'' into the mixing and plasticizing cylinder 7. If the material has a good flowability and for example is present in powder form or granular form, it may also flow directly into the cylinder via the open feeding hopper 9 according to FIG. 4. At the feeding process the mixing and plasticizing rotor for example may be in the end position according to FIG. 4. The mixing and plasticizing rotor, however, may also rotate at the feeding procedure and may also be axially moved back and forth. When the mixing and plasticizing cylinder has been filled, the mixing and plasticizing rotor is rotated and moved axially, until the other end position has been attained. The rotary direction is in this case selected so, that the screw 25 feeds the mixing and plasticizing material towards the mixing and plasticizing cylinder 7. The axial speed of the mixing and plasticizing rotor 23 is controlled to such a degree, that no mixing or plasticizing material is moved into the screw cylinder 7'. In this way the number of strokes necessary for the mixing and plasticizing process may be completed, the mixing and plasticizing material substantially remaining in the mixing and plasticizing cylinder 7. As the screw 25 is projected into the mixing and plasticizing cylinder at every stroke, the screw also contributes substantially to the mixing and plasticizing process. In this way for example plastics in powder form may be very well melted by the friction heat along generated by the mixing and plasticizing rotor 23, and in this case also plastic material with a very low friction coefficient may be processed. Of course, also any desired filling agents, pigments, plasticizing etc. may be mixed at the same time with the material.

The mixing and plasticizing cylinder 7 as well as the screw cylinder 7' may be heated or cooled in usual manner with heating sleeves, jackets, etc. Moreover, the mixing and plasticizing rotor 23 as well as the screw 25 may be internally hollow and they may be cooled or heated. After the necessary number of strokes has been completed and the desired mixing and plasticizing effect has been attained, the rotary direction of the mixing and plasticizing rotor 24 is reversed, the screw 25 now feeding the mixing and plasticizing material into the screw cylinder 7' towards the discharge opening or orifice 26. Now, again, the number of strokes necessary to empty the mixing and plasticizing cylinder 7 is performed. At the rotation and simultaneous axial motion of the screw 25 the mixing and plasticizing cylinder 7 is pumped empty. In the case of viscoelastic mixing and plasticizing materials the so called Weissenberg Effect contributes to the transportation of the material towards the center of the rotor at the rotation and axial motion of the mixing and plasticizing rotor 23, and thus the material is moved towards the screw.

If the machine according to the present invention is to be used as a plasticizing machine, for example for injection molding machines, blow molding machines, presses, etc., it may for example be operated in the following way:

The material to be plasticized is fed into the mixing and plasticizing cylinder 7 by the feeding screw 10' according to FIG. 2 or by a feeding ram 10'' according to FIG. 3. In this case, the mixing and plasticizing rotor 23 is situated in the start position illustrated in FIG. 2. Now, the mixing and plasticizing rotor 23 is rotated, the rotational direction being selected so that the screw 25 feeds the plasticizing material into the screw cylinder 7' towards the orifice or discharge opening 26. Thereafter the mixing and plasticizing rotor 23 is moved to the right (see FIGS. 2, 3 and 5), so that the plastic material, which for example is present in powder form, granular form or in the form of film linters, is melted or plasticized by the friction heat generated by the mixing and plasticizing rotor 23 and is fed to the screw 25 in melted or plasticized form via the passages 24. At the simultaneous rotation and axial motion of the screw the plasticized material is fed along the screw flights, as in the case of prior art axial motion screw plasticizing machines for injection molding machines. When the mixing and plasticizing rotor 23 has reached the other end position according to FIG. 5, all material in the mixing and plasticizing cylinder 7 has been plasticized and moved by the screw to the front part of the screw cylinder 7'. Now the discharge of the plasticized material may be effected in the same way as in the case of prior art screw plasticizing machines, i.e. the mixing and plasticizing rotor 23 together with the screw 25 are moved axially to the left again, until the end position illustrated in FIG. 2 has been reached. The mixing and plasticizing rotor 23 together with the screw 25 may be rotating or non-rotating in this case. The above-described machine has substantial advantages compared to prior art screw plasticizing machines, particularly for processing high molecular plastics in powder form, e.g. high molecular polyethylene in powder form, polystyrene in powder form or suspension pearl form, polyvinylchloride in powder form etc. These plastics may not at all or only at substantial difficulty be processed in screw plasticizing machines of prior art, as due to lack of wetting in the feeding zone of the screw no transport is effected.

The mixing and plasticizing rotor 23, thus, serves as an extremely efficient pre-plasticizing means for the screw 25. The screw may of course be designed as usually in the case of prior art plasticizing screws and it may e.g. have varying screw flight depth, etc. In the position illustrated in FIG. 2 the mixing and plasticizing rotor at the end of the screw discharge stroke serves as an efficient back-flow valve for the plastic material injected or pressed into a mold. Thus, a back-pressure of any desired value may be provided.

If the plasticizing material is only insufficiently plasticized at one stroke of the mixing and plasticizing rotor or if also a mixing process is to be carried out, e.g. addition of glass fibers or colorants, also several strokes may be carried out. In this case, the rotary direction of the mixing and plasticizing rotor is chosen so, that the screw is feeding towards the mixing and plasticizing cylinder. When the number of strokes necessary for the mixing or plasticizing process has been carried out, the mixing and plasticizing rotor 23 is moved to the position illustrated in FIG. 2 again. Now the rotary direction is selected so, that the screw 25 feeds the mixing and plasticizing material into the screw cylinder 7' towards the orifice 26, and the mixing and plasticizing rotor 23 together with the screw 25 are moved to the right again, the pre-plasticizing material being fed by the screw into the front-part of the screw cylinder 7'. Thereafter the discharge is effected by axial motion of the mixing and plasticizing rotor 23 together with the screw 25 to the left, until the position illustrated in FIG. 2 has been reached again.

If the plasticized material is not fed into the screw cylinder by one stroke, several strokes may be carried out, each stroke being shorter. In this way the material is pumped out of the mixing and plasticizing cylinder 7 into the screw cylinder 7'. The process may be electronically controlled.

FIG. 6 illustrates a longitudinal vertical sectional view of a machine with partly conical design of the mixing and plasticizing cylinder 7 as well as the mixing and plasticizing rotor 23. By this design the transport of the material into the screw cylinder 7' is flow-dynamically promoted.

Finally, the function of the machine at continuous operation is to be illustrated according to FIGS. 2, 4 and 7. At continuous operations the material to be mixed and/or plasticated is continuously metered and fed via the feeding hopper. For this purpose, of course, a feeding screw 10' may be used or the material may be fed directly via the feeding hopper 9 according to FIG. 4 if it is free-flowing. Sticky or highly viscous materials, as well as film scrap in the form of bales, linters, plastic material in piece form, scrap material, etc. may also be fed via the feeding ram 10". The rotary direction of the mixing and plasticizing rotor 23 is selected so, that the screw all the time feeds the mixing and plasticizing material in the screw cylinder 7' towards the discharge opening or orifice 26. The mixed and plasticized material, thus, is fed through the discharge opening or orifice 26 in a pulsating manner. By control of the stroke frequency and the rotary speed of the mixing and plasticizing rotor the dwelling time of the material to be mixed or plasticized may be controlled. The through-going openings or passages 24 in this case may also be conical, the conical passages e.g. getting narrower in the feeding direction of the screw.

At continuous operation of the machine there may of course also be several mixing and plasticizing rotors on a common screw shaft as illustrated in FIG. 7. Each mixing and plasticizing rotor is axially moved in a corresponding mixing and plasticizing cylinder. In FIG. 7 after the mixing and plasticizing rotor 23 a second mixing and plasticizing rotor 23' with the screw 25' and the mixing and plasticizing cylinder 7" as well as the corresponding screw cylinder 7''' have been provided. Of course, also more than two mixing and plasticizing rotors of screw units, respectively, may be coupled together. In this way an extremely intensive mixing, kneading and plasticizing effect is attained. The mixing and plasticizing cylinder may be longitudinally split and folded out for easier cleaning. The diameters of the individual mixing and plasticizing rotors as well as the screw elements may be varied. Thus, multi-stage processes with variable friction and shear force conditions may be carried out. The screw elements 25,25' etc. effect a positive material transport between the mixing and plasticizing cylinders 7,7", etc. The embodiment illustrated in FIG. 7 is not only useful as a continuous mixing and plasticizing machine for plastics, rubber and highly viscous and pasty substances of any kind, but also as a reactor for the continuous operation of chemical reactions with highly viscous melts, etc., as for example in the plastic raw material industry. I.a. polymerization reactions as well as mechano-chemical break-down and depolymerization reactions may be carried out, with or without catalysts or free-radical forming agents. Thus, e.g. extremely high molecular polyolefins may be broken down to any desired lower molecular weights. The machine according to the invention is also useful for the manufacture of so called polymer alloys or polymeric melt emulsions, which contain finely dispersed starting polymers and block-grafted polymers.

FIG. 8, finally, illustrates a longitudinal sectional view of a machine for continuous operation with another placement of the feeding hopper. The shaft 8 of the mixing and plasticizing rotor 23 is at the same time designed as a screw 25" and the material to be mixed and plasticized is directly fed to the screw flights of the axially movable screw 25".

The rotary drive of the mixing and plasticizing rotor 23 may also be axially not movable, the shaft 8 of the mixing and plasticizing rotor e.g. being designed as a splined shaft and being axially movable in a splined hub of the rotary drive by action of the working cylinder 15.

The shaft 8 of the mixing and plasticizing rotor may also as in the case of prior art screw plasticizing machines be firmly connected to the piston rod 16 of the working cylinder 15, so that the working piston of the working cylinder 15 rotates together with the shaft 8 at the axial motion.

The movements of the mixing and plasticizing rotor and the screw or of several mixing and plasticizing rotors with corresponding screw elements may be electronically controlled, e.g. by punch card control, numerical control or computer control. Thus, a fully automatic performance of the machine of the present invention is accomplished.

The machine according to the present invention may of course also be built vertically. For the relative motion of the axially movable parts of the machine one may also use e.g. a frame-type press instead of the tie-rod type press mentioned, the axially movable parts of the machine being guided between the frames on sliding rails, sliding platens or other guiding elements of any kind.

While specific embodiments of the invention have been shown and described in detail to illustrate the application of the invention principles, it will be understood that the invention may be embodied otherwise without departing from such principles.

What is claimed is:

1. Mixing and plasticizing machine, which comprises at least one mixing and plasticizing cylinder with at least one screw cylinder, at least one axially movable mixing and plasticizing rotor with passageways therethrough, the shaft of said mixing and plasticizing rotor being connected to a rotary drive outside said mixing and plasticizing cylinder, the internal wall area of said mixing and plasticizing cylinder being scraped off by said mixing and plasticizing rotor, and at least one axially movable rotary screw, which is coaxially connected to said mixing and plasticizing rotor.

2. The machine according to claim 1, wherein said rotary drive of said axially movable mixing and plasticizing rotor is guided on at least two tie-rods and is axially movable on said tie-rods by a double-action working cylinder.

3. The machine according to claim 1, wherein said rotary drive of said axially movable mixing and plasticizing rotor is axially not movable and the shaft of said axially movable mixing and plasticizing rotor is engaged with said rotary drive and is axially movable in relation to said rotary drive.

4. The machine according to claim 1, wherein the shaft of said axially movable mixing and plasticizing rotor is firmly connected to the piston rod of a double-action working cylinder, so that the working piston of said working cylinder rotates together with said shaft at the axial motion.

5. The machine according to claim 1, which comprises two fixed platens, which are connected by at least two tie rods, two movable platens which are axially movable on said tie rods, and a double-action working cylinder, which is mounted at one of said fixed platens, said mixing and plasticizing cylinder being mounted at one of said fixed platens and said rotary drive being mounted between said axially movable platens.

6. The machine according to claim 1, wherein the end of said screw cylinder is provided with an orifice, the contents of said mixing and plasticizing cylinder or of said screw cylinder being pressed out of said orifice.

7. The machine according to claim 1, wherein the mixing and plasticizing cylinder is provided with a feeding hopper with a feeding ram.

8. The machine according to claim 1, wherein said mixing and plasticizing rotor and said screw, which is coaxially connected to said mixing and plasticizing rotor, are made hollow and are cooled or heated.

9. The machine according to claim 1, wherein plastic material is plasticized or melted by the friction work alone generated by the mixing and plasticizing rotor.

10. The machine according to claim 1, wherein at least two axially movable mixing and plasticizing rotors are mounted on a common screw shaft, each axially movable mixing and plasticizing rotor having a corresponding mixing and plasticizing cylinder and each axially movable screw element having a corresponding screw cylinder.

11. The machine according to claim 1, wherein the passageways of said mixing and plasticizing rotor have slot cross-sectional configuration or polygonal cross-sectional configuration.

12. The machine according to claim 1, wherein the passageways of said mixing and plasticizing rotor are cylindrical or conical holes.

13. The machine according to claim 1, wherein said mixing and plasticizing rotor is at one side or both sides conical and said mixing and plasticizing cylinder is conical in corresponding parts.

14. The machine according to claim 1, wherein said axially movable mixing and plasticizing rotor with the screw performs at least one stroke in said mixing and plasticizing cylinder, so that by reversal of the rotary direction of said mixing and plasticizing rotor the feeding direction of said screw may be reversed.

15. The machine according to claim 1, wherein in order to plasticize plastics and rubber said axially movable mixing and plasticizing rotor with the screw performs one stroke in the mixing and plasticizing cylinder, the rotational direction being chosen so that the screw feeds the plasticized material into the screw cylinder towards the discharge opening, whereafter the plasticized material in the screw cylinder is discharged by one stroke.

16. The machine according to claim 15, wherein for batch operation of the machine the rotary direction of said axially movable mixing and plasticizing rotor during the mixing and plasticizing process is selected so that the screw feeds the material towards the mixing and plasticizing cylinder, and that in order to empty the mixing and plasticizing cylinder the rotary direction is reversed, so that the screw feeds the mixing and plasticizing material into the screw cylinder towards the discharge opening.

17. The machine according to claim 1, wherein for continuous operation of the machine the axially movable mixing and plasticizing rotor during the mixing and plasticizing process is axially moved back and forth in the mixing and plasticizing cylinder, the rotary direction being selected so that the screw feeds the mixing and plasticizing material into the screw cylinder towards the discharge opening.

* * * * *